March 18, 1930.   L. P. MOOERS   1,750,936
BRAKE MECHANISM FOR MOTOR VEHICLES
Filed Dec. 17, 1924   3 Sheets-Sheet 1
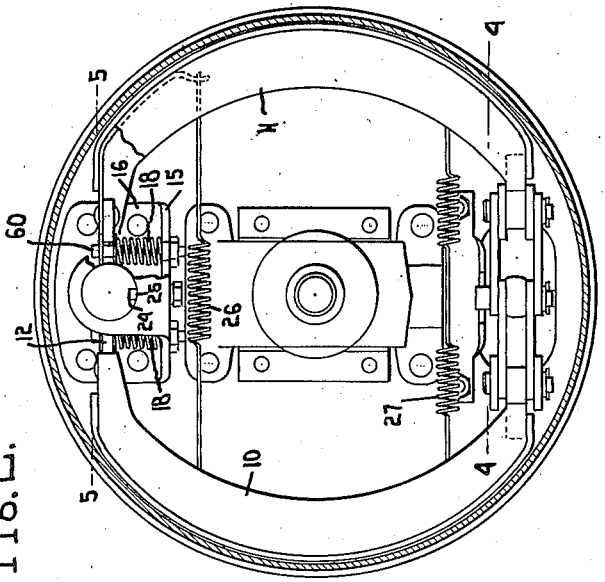
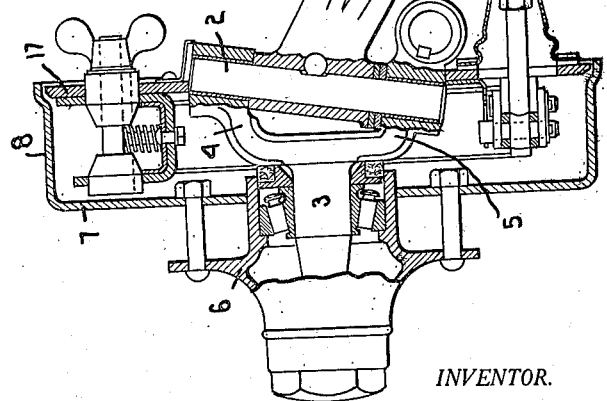
INVENTOR.
Louis P. Mooers
BY
ATTORNEYS.

March 18, 1930.                L. P. MOOERS                1,750,936
                    BRAKE MECHANISM FOR MOTOR VEHICLES
                    Filed Dec. 17, 1924        3 Sheets-Sheet 2
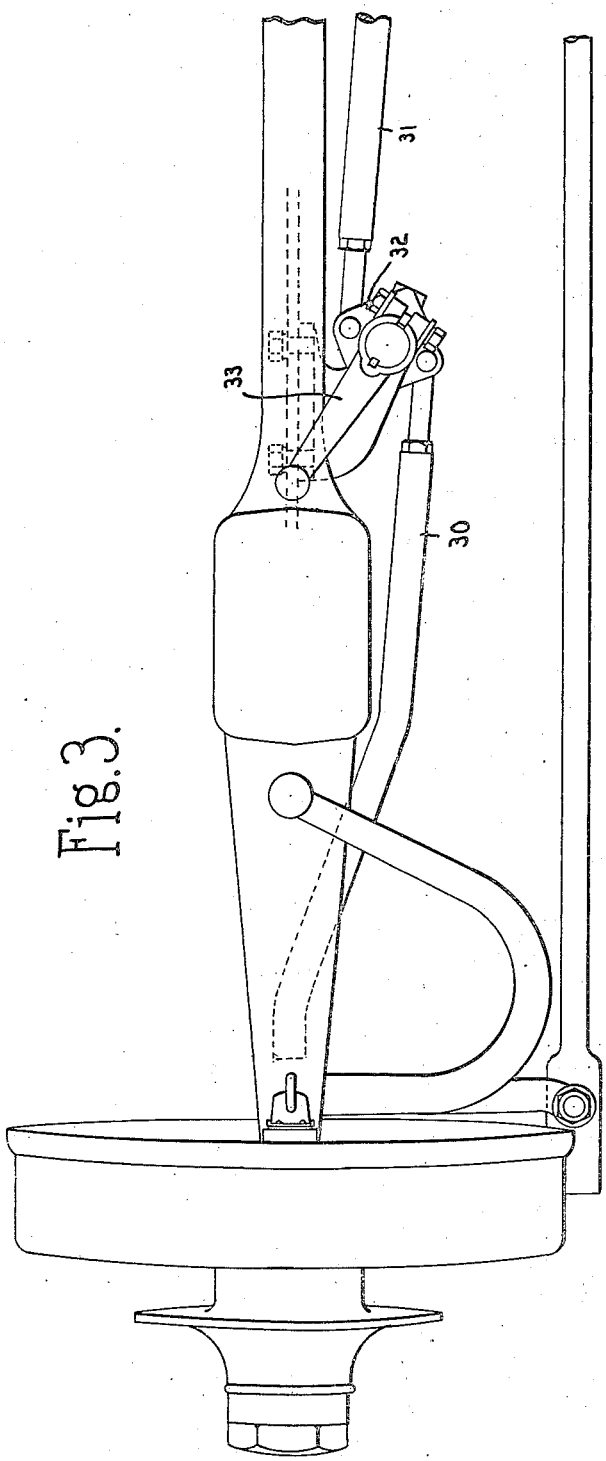
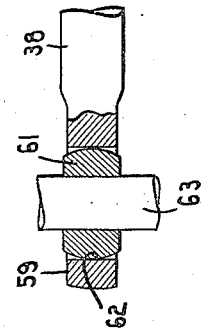
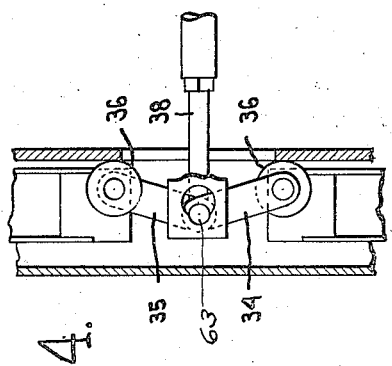
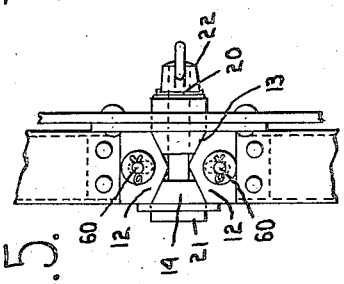
INVENTOR.
Louis P. Mooers
BY Fray, Oberlin & Fray
ATTORNEYS.

March 18, 1930.  L. P. MOOERS  1,750,936
BRAKE MECHANISM FOR MOTOR VEHICLES
Filed Dec. 17, 1924  3 Sheets-Sheet 3
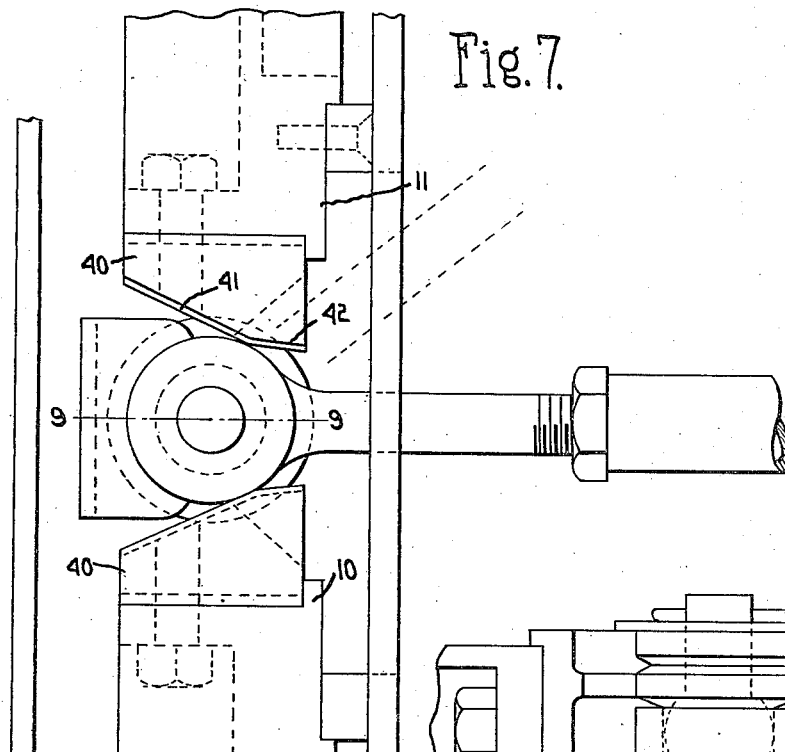
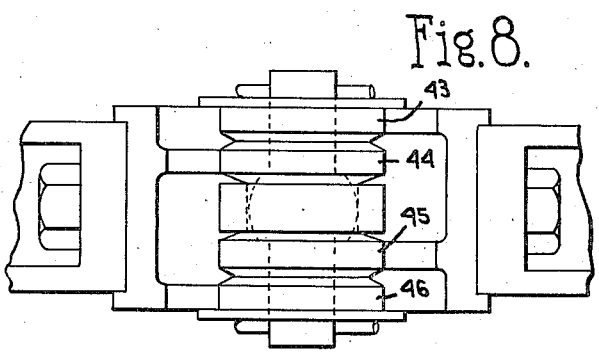
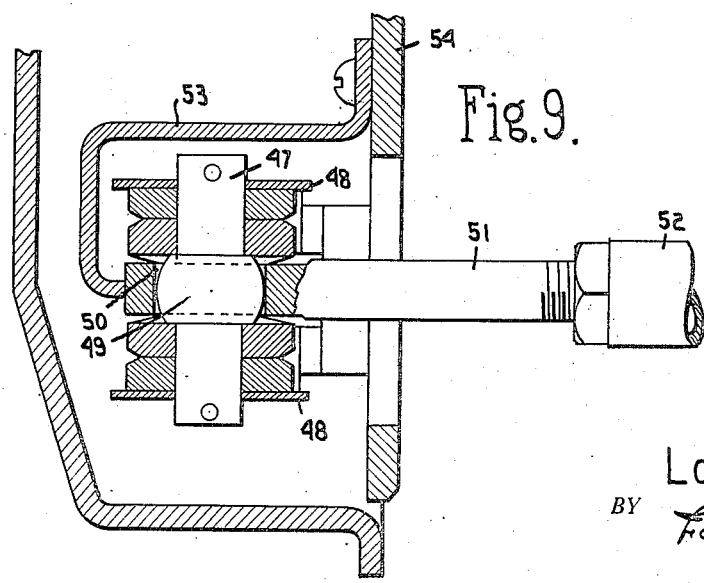
INVENTOR.
Louis P. Mooers
BY
ATTORNEYS.

Patented Mar. 18, 1930

1,750,936

UNITED STATES PATENT OFFICE

LOUIS P. MOOERS, OF CLEVELAND, OHIO, ASSIGNOR TO THE COLUMBIA AXLE COMPANY, OF CLEVELAND, OHIO, A CORPORATION OF OHIO

BRAKE MECHANISM FOR MOTOR VEHICLES

Application filed December 17, 1924. Serial No. 756,429.

The present invention, relating, as indicated, to brake mechanism for motor vehicles, is more particularly directed to an improved operating means for use in connection with brakes on the front wheels of motor vehicles and of the type described in copending application of Frederick H. Ragan, Serial No. 692,302. The principal object of the invention is the provision of improved connections between the brake shoes and the brake pedal, and more particularly the longitudinally movable bar which characterizes this type of brake mechanism. A further object of the invention is the provision of an extremely simple and economical means for adjusting the initial position of the brake shoes, while still other objects of the invention will appear hereinafter. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Fig. 1 is a front elevation partially in section showing my invention applied to the front axle and front wheel of a motor vehicle; Fig. 2 is a side elevation of the brake drum, shoes and operating means therefor; Fig. 3 is a plan view of the mechanism shown in Fig. 1; Fig. 4 is a horizontal section on the line 4—4, Fig. 2; Fig. 5 is a section on the line 5—5, Fig. 2; Fig. 6 is a side elevation of one of the brake-operating elements; Fig. 7 is a view corresponding to Fig. 4, but showing a modification of the construction there shown; Fig. 8 is an end elevation of the brake actuating mechanism and of the ends of the brake shoes of the type shown in Fig. 7; and Fig. 9 is a section on the line 9—9, Fig. 7.

Referring now to Figs. 1, 2 and 3 there is shown a typical front axle 1 of a motor vehicle, to one end of which there is journaled a shaft 2 commonly termed the king pin, upon which is oscillatorily mounted a wheel spindle 3 which is provided with forked ends 4 and 5. On the wheel spindle 3 is shown a hub 6 of a wheel, to which is secured a brake drum 7 having a lateral circumferential flange 8, against which the brake shoes are adapted to engage upon operation.

The brake mechanism proper consists of two semi-circular shoes 10 and 11, the upper ends of which are provided with tongues 12, which are reversely beveled and are adapted to fit against opposed frusto-conical members 13 and 14. The shoes are held in position initially by bolts 60 which pass through openings formed in the tongues and are secured to a flange 15 formed on a plate 16, which is riveted to the dust shield 17 carried on the spindle. Springs 18, interposed between the tongues and the flange 15, maintain the shoes in their radially outermost position, while allowing a tilting of the shoes about the bolts 60 when the shoes are operated.

The initial position of the shoes may be adjusted by means of a bolt 20, which is provided with an integral head 21, which is slidable against the outer surfaces of the members 12, where it is engaged by a wing nut 22. The two members 13 and 14 are slidably mounted in the plate 16 and are maintained against rotation by being provided with notches 24 which engage the tongues 25 formed on the two sides of the plate 16. By turning the wing nut 22 the two aforesaid conical members 13 and 14 are drawn toward each other, thus spreading apart the two ends of the brake shoes which are maintained in engagement against the frusto-conical members by means of transverse springs 26 and 27.

The brake operating means are shown in Figs. 1, 2, 3 and 4, and consist of two transversely extending members 30 and 31 connected at their inner ends to a lever 32, to which is secured an operating arm 33. At their outer ends each of the members 30 and 31 is pivotally connected to two links 34 and 35, each of which is pivotally secured at its other end to one end of the two shoes 10 and 11, while about the same axis are mounted rollers 36, which engage against the dust shield 17 and reduce the friction of the brake shoes which would otherwise stick against the dust shield during operation. Each of the members 30 and 31 is connected to the arms 34 and 35 by means of a short rod 38, which is adjustably connected to the member 30, and which, at its outer end, is provided with an opening 59 within which is mounted a disk 61 having a spherical outer surface 62. This construction permits the rod 30 to oscillate slightly without transmitting such oscillation to the pin 63, which is the axis of pivotal connection between the member 30 and the two links or arms 34 and 35, and in this way a substantially universal connection is secured between these parts, having a sufficient range of movement to absorb any slight twisting of the operating rods 30 and 31 without affecting the action of the brakes in the wheels.

In Figs. 7, 8 and 9 I have shown a modification of the foregoing construction, in which the ends of the brake shoes 10 and 11 are provided with removable friction plates or blocks 40, each of which has beveled bearing surfaces 41 and 42. Interposed between these adjacent free ends of the shoes 10 and 11 are a plurality of rollers 43, 44, 45 and 46, the rollers 43 and 45 bearing against one of the blocks 40, while rollers 44 and 46 bear against the other. In Fig. 8 it will be seen that the blocks 40 are interchangeable, and the same block may be used on either of the ends of the brake shoes. All of the rollers 43, 44, 45 and 46 are rotatably mounted upon a stud or shaft 47, to the ends of which are secured plates 48 for retaining the rollers in position, and this shaft 47 is provided with a central spherical portion 49, which fits within an opening 50 formed in the inner end of a member 51 secured to the actuating rod 52, which is movable longitudinally of the axle in exactly the same manner as the members 30 and 31 of the construction previously described. A centralizing plate 53, secured to the dust shield 54, forms a limiting and locating stop for the inactive position of the member 51 and the rollers.

In action, the rod 52, when moving longitudinally of the axle, is turning on its axis through a slight angular distance and is also caused to rock the rollers, thus lifting one of the brake shoes. I avoid, by the present construction, both tendencies, since in both of the constructions described a universal connection is interposed between the pull rod and the operating mechanism, whether this consists of the arms 34 and 35 or the rollers of Figs. 7, 8 and 9. In this latter contsruction the shaft 47, and with it the rollers, are enabled to tilt in any direction a few degrees with respect to the rod 51, and thus any tendency to spread or lift the shoes, caused by any undesired movement of the rod 52, as when the wheels are turned for steering, is compensated for and all movement of the brake shoes, except that produced by the operator through the brake pedal, is eliminated.

Other modes of applying the principle of my invention may be employed instead of the one explained, change being made as regards the mechanism hereindisclosed, provided the means stated by any of the following claims or the equivalent of such stated means be employed.

I therefore particularly point out and distinctly claim as my invention:

1. In mechanism of the character described, the combination of a wheel, a brake drum secured thereto, brake shoes normally spaced from engagement with said drum and movable outwardly into braking engagement with said drum, actuating means movable at right angles to the plane of said wheel for moving said shoes into braking engagement, and anti-friction means maintaining said shoes against lateral displacement during such action.

2. In mechanism of the character described, the combination of a wheel, a brake drum secured thereto, brake shoes normally spaced from engagement with said drum and movable outwardly into braking engagement with said drum, toggle actuating mechanism movable at right angles to the plane of said wheel for moving said shoes into braking engagement, said means including a rod movable at right angles to the plane of said shoes for actuating the same into braking engagement, and anti-friction means carried by said toggle mechanism, said means maintaining said shoes against lateral displacement during such movement.

3. In mechanism of the character described, the combination of a wheel, a brake drum secured thereto, brake shoes normally spaced from engagement with said drum and movable outwardly into braking engagement therewith, actuating means movable at right angles to the plane of said wheel for moving said shoes into operative engagement, and means carried by said shoes and maintaining the same against lateral displacement during such movement, said means being adapted to hold said shoes in the same lateral position at all times.

4. In mechanism of the character described, the combination of a wheel, a brake drum secured thereto, brake shoes normally spaced from engagement with said drum and movable outwardly into braking engagement therewith, actuating means movable substantially paraxially of said wheel for moving said shoes into operative engagement, and means associated with said actuating means and movable with said shoes for preventing lateral displacement of said brake shoes.

5. In mechanism of the character described, the combination of a wheel, a brake drum secured thereto, brake shoes normally spaced from engagement with said drum and movable outwardly into braking engagement therewith, actuating means movable substantially paraxially of said wheel for moving said shoes into operative engagement, and means connected to said shoes adjacent the ends thereof for maintaining said shoes from lateral displacement during the braking action, said last named means being movable with said shoes.

6. In mechanism of the character described, the combination of a wheel, a brake drum secured thereto, brake shoes normally spaced from engagement with said drum and movable outwardly into braking engagement therewith, actuating means movable substantially paraxially of said wheel for moving said shoes into operative engagement, and roller means movable with said shoes and adapted to maintain the same from lateral displacement during said braking movement.

7. In mechanism of the character described, the combination of a wheel, a brake drum secured thereto, a dust plate for said drum, brake shoes normally spaced from engagement with said drum and movable outwardly into braking engagement therewith, actuating means movable substantially paraxially of said wheel for moving said shoes into operative engagement, and rollers attached to the ends of said shoes, said rollers contacting with said dust plate to prevent lateral displacement of the shoes during said braking movement.

8. In mechanism of the character described, the combination of a wheel, a brake drum secured thereto, brake shoes normally spaced from engagement with said drum and movable outwardly into braking engagement therewith, means for non-rotatably mounting said brake shoes, actuating means movable substantially paraxially of said wheel for moving said shoes into operative engagement, and means associated with said shoes and with said actuating means adapted to prevent lateral displacement of said shoes during the braking movement, said last named means being adapted to maintain said shoes at all times in the same lateral position.

9. In mechanism of the character described, the combination of a brake drum, brake shoes normally spaced from engagement with said drum and movable outwardly into braking engagement therewith, actuating means movable substantially paraxially of said drum for moving said shoes into operative engagement, means for centralizing said shoes when in inactive position, and means preventing lateral displacement of said shoes during the braking movement.

10. In mechanism of the character described, the combination of a brake drum, a dust plate therefor, brake shoes normally spaced from engagement with said drum and movable outwardly into braking engagement therewith, actuating means movable substantially paraxially of said drum for moving said shoes into operative engagement, means mounted on said dust plate adapted to cooperate with said actuating means to centralize said shoes when in inactive position, and means adapted to prevent lateral displacement of said shoes during the braking movement.

11. In mechanism of the character described, the combination of a brake drum, a dust plate therefor, brake shoes normally spaced from engagement with said drum and movable outwardly into braking engagement therewith, actuating means movable substantially paraxially of said drum for moving said shoes into operative engagement, means mounted on said dust plate adapted to cooperate with said actuating means to centralize said shoes when in inactive position, and means carried by said shoes and bearing on said dust plate adapted to prevent lateral displacement of the shoes during the braking movement.

Signed by me, this 12th day of December, 1924.

LOUIS P. MOOERS.